United States Patent
Hua et al.

(10) Patent No.: US 9,631,683 B2
(45) Date of Patent: Apr. 25, 2017

(54) OPERATION MECHANISM, DUAL-CLUTCH ASSEMBLY AND VEHICLE

(71) Applicants: SHENZHEN BYD AUTO R&D COMPANY LIMITED, Shenzhen, Guangdong (CN); BYD COMPANY LIMITED, Shenzhen, Guangdong (CN)

(72) Inventors: Yu Hua, Shenzhen (CN); Jinhui Mu, Shenzhen (CN); Lingdao Chai, Shenzhen (CN); Jintao Zhang, Shenzhen (CN)

(73) Assignees: SHENZHEN BYD AUTO R&D COMPANY LIMITED, Guangdong (CN); BYD COMPANY LIMITED, Shenzhen, Guangdong (CN)

( * ) Notice: Subject to any disclaimer, the term of this patent is extended or adjusted under 35 U.S.C. 154(b) by 148 days.

(21) Appl. No.: 14/383,493

(22) PCT Filed: Mar. 13, 2013

(86) PCT No.: PCT/CN2013/072554
§ 371 (c)(1),
(2) Date: Sep. 5, 2014

(87) PCT Pub. No.: WO2013/143394
PCT Pub. Date: Oct. 3, 2013

(65) Prior Publication Data
US 2015/0034443 A1    Feb. 5, 2015

(30) Foreign Application Priority Data

Mar. 31, 2012    (CN) .................. 2012 2 0141137 U

(51) Int. Cl.
*F16D 23/12* (2006.01)
*F16D 23/14* (2006.01)
(Continued)

(52) U.S. Cl.
CPC .............. *F16D 23/12* (2013.01); *F16D 21/00* (2013.01); *F16D 21/06* (2013.01); *F16D 23/14* (2013.01);
(Continued)

(58) Field of Classification Search
CPC .... F16D 23/12; F16D 23/14; F16D 2023/141; F16D 21/00; F16D 21/06; F16D 2021/0669; Y02T 10/76
See application file for complete search history.

(56) References Cited

U.S. PATENT DOCUMENTS

2011/0100777 A1* 5/2011 Wilton .................. F16D 13/752
                                                                192/85.62
2012/0222512 A1* 9/2012 Renard .................. F16D 21/06
                                                                74/331

FOREIGN PATENT DOCUMENTS

CN       1576083 A      2/2005
CN     202007844 U     10/2011
(Continued)

OTHER PUBLICATIONS

Shenzhen BYD Auto R&D Company Limited, International Search Report, PCT/CN2013/072554, May 16, 2013, 5 pgs.

*Primary Examiner* — Jacob S Scott
(74) *Attorney, Agent, or Firm* — Morgan, Lewis & Bockius LLP

(57) ABSTRACT

An operation mechanism for a dual-clutch assembly is provided. The dual-clutch assembly comprises a first clutch having a first clutch bearing, and a second clutch having a second clutch bearing. The operation mechanism comprises: a supporting member; a first operation member adapted to be rotatably coupled to the supporting member and to actuate the first clutch bearing; and a second operation member adapted to be rotatably coupled to the supporting member and to actuate the second clutch bearing. The second opera- (Continued)

tion member is always spaced a predetermined distance from the first operation member in an operation direction.

11 Claims, 4 Drawing Sheets

(51) Int. Cl.
    *F16D 21/06*       (2006.01)
    *F16D 21/00*       (2006.01)

(52) U.S. Cl.
    CPC ............... *F16D 2021/0669* (2013.01); *F16D 2023/141* (2013.01); *Y02T 10/76* (2013.01)

(56) References Cited

FOREIGN PATENT DOCUMENTS

| | | |
|---|---|---|
| CN | 202597672 U | 12/2012 |
| DE | 1505577 A1 | 7/1970 |
| DE | 102009039991 A1 | 4/2010 |
| EP | 1508715 A2 | 2/2005 |
| EP | 1508715 A3 | 6/2005 |
| WO | WO 2005028902 A1 | 3/2005 |
| WO | WO 2010/086540 A1 | 8/2010 |

* cited by examiner

OPERATION MECHANISM, DUAL-CLUTCH ASSEMBLY AND VEHICLE

RELATED APPLICATIONS

This application is a U.S. National Stage Application filed under 35 U.S.C. §371 of PCT Patent Application Ser. No. PCT/CN2013/072554 filed on Mar. 13, 2013, which claims the benefit of and priority to Chinese Patent Application No. 201220141137.5, filed on Mar. 31, 2012, which are hereby incorporated by reference in their entireties.

TECHNICAL FIELD

The present disclosure relates to an operation mechanism for a dual-clutch assembly, a dual-clutch assembly comprising the operation mechanism, and a vehicle comprising the dual-clutch assembly.

BACKGROUND

A clutch is generally used for connecting and disconnecting the power transmission between the engine and the transmission. The gearshift of the transmission of the vehicle is achieved by engaging and disengaging of the clutch. There may be interruption of power transmission between engaging and disengaging of the clutch.

DCT (dual-clutch transmission) is developed based on the conventional parallel-shaft-type manual transmission and comprises first and second clutches. The crankshaft of the engine is coupled to the first transmission via the first clutch to transmit the torque. The first clutch comprises a first clutch bearing and the second clutch comprises a second clutch bearing. The first and second clutch bearings are driven by an operation mechanism so as to perform the gearshift. Conventional DCT is complex in structure and manufacturing process, and high in manufacture cost.

SUMMARY

The present disclosure seeks to solve at least one of the problems existing in the prior art to at least some extent. To this end, an object of the present disclosure is to provide an operation mechanism for a dual-clutch assembly having a simple structure.

Another object of the present disclosure is to provide a clutch assembly comprising the operation mechanism.

A further object of the present disclosure is to provide a vehicle comprising the dual-clutch assembly.

According to some embodiments of the present disclosure, the dual-clutch assembly comprises a first clutch having a first clutch bearing, and a second clutch having a second clutch bearing. The operation mechanism comprises: a supporting member; a first operation member adapted to be rotatably coupled to the supporting member and to actuate the first clutch bearing; and a second operation member adapted to be rotatably coupled to the supporting member and to actuate the second clutch bearing. The second operation member is always spaced a predetermined distance from the first operation member in an operation direction.

With the operation mechanism according to embodiments of the present disclosure, the first operation member is configured to be always spaced a predetermined distance from the second member in the operation direction such as the axial direction of the supporting member. Thus, the first and second operation members may not overlap or interfere with each other. Moreover, none of the first and second operation members may be supported on or positioned in the other. In other words, the first and second operation memebers have different operation areas which are independent of each other and may not overlap or interfere with each other. In this way, the operation mechanism is simple in structure and long in operation life.

In some embodiments, the first operation member is always spaced the predetermined distance from the second operation member in an axial direction of the supporting member.

In some embodiments, the first clutch bearing comprises a first bearing element, and the first operation member comprises a first bearing area configured to contact the first bearing element. The second bearing comprises a second bearing element, and the second operation member comprises a second bearing area configured to contact the second bearing element.

In some embodiments, the supporting member comprises first and second supporting elements coupled to each other and having different heights from each other. The first supporting element comprises a first positioning portion, and the first operation member comprises a first rotation portion rotatably coupled to the first positioning portion. The second supporting element comprises a second positioning portion, and the second operation member comprises a second rotation portion rotatably coupled to the second rotation portion.

In some embodiments, the first operation member comprises a first guide groove formed at an end of the first operation member opposite the first rotation portion.

In some embodiments, the second operation member comprises a second guide groove formed at an end of the second operation member opposite the second rotation portion.

In some embodiments, the first operation member comprises a reinforcing structure.

In some embodiments, the reinforcing structure is configured with a reinforcing rib.

In some embodiments, the second operation member comprises an arc transitional structure.

In some embodiments, a clutch assembly comprising the above mentioned operation mechanism is provided.

In some embodiments, a vehicle comprising the clutch assembly is provided.

Additional aspects and advantages of the embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions made with reference the accompanying drawings, in which.

DETAILED DESCRIPTION

Figure 1:
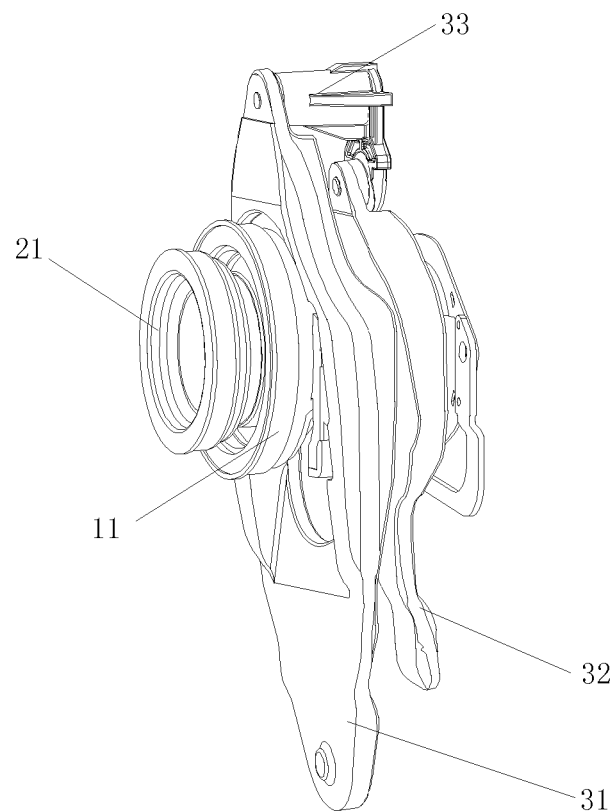
FIG. 1 is a schematic view of the operation mechanism according to an embodiment of the present disclosure.
Figure 2:
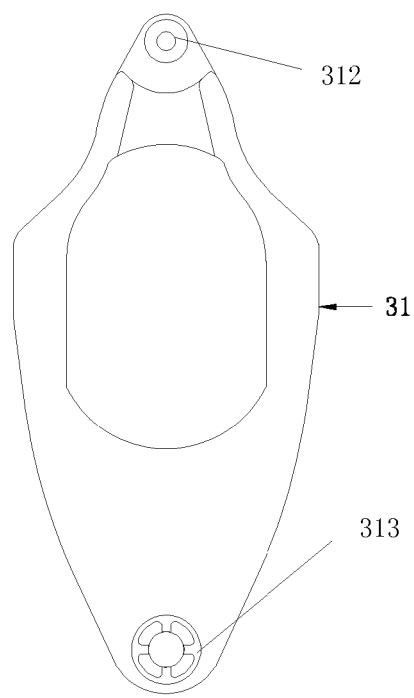
FIG. 2 is a front view of a first operation member of the operation mechanism according to an embodiment of the present disclosure.
Figure 3:
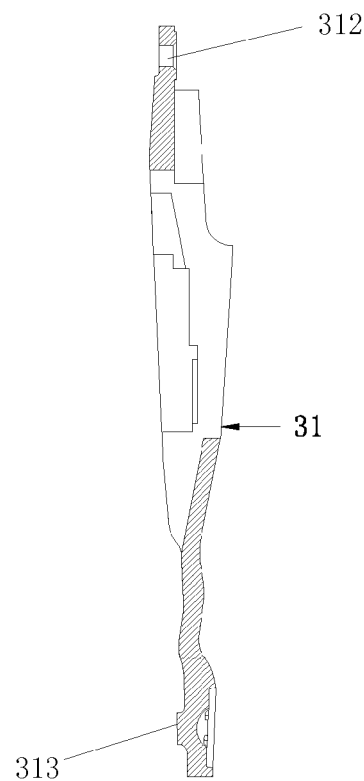
FIG. 3 is a cross-section view of a first operation member of the operation mechanism according to an embodiment of the present disclosure.

Reference will be made in detail to embodiments of the present disclosure, samples of described embodiments are indicated in the drawings. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description, Unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation. In the present application, terms such as "first" and "second" are used herein for purposes of description and are not intended to indicate or imply relative importance or significance. Term "plurality" can be understood as two or more than two, unless expressly described otherwise.

Unless specified or limited otherwise, the terms "mounted," "connected," "coupled", and "secured" and variations thereof are used broadly, such as rigid attachments, also movable attachments, or integrated attachments; mechanical connections, also refer to a relationship wherein structures are secured or attached to one another either directly or indirectly through intervening structures, or structures having their interiors connected. As to those skilled in the art, specific meaning of the above mentioned terms in the present disclosure can be understood in accordance with specific conditions.

An operation mechanism for a dual-clutch assembly according to embodiments of the present disclosure will be described with reference to FIGS. 1-7.

According to embodiments of the present disclosure, an operation mechanism 3 for a dual-clutch assembly is provided. The dual-clutch assembly comprises a first clutch 1 having a first clutch bearing 11, and a second clutch 2 having a second clutch bearing 21. As shown in FIGS. 1-7, the operation mechanism 3 comprises: a supporting member 33; a first operation member 31 adapted to be rotatably coupled with the supporting member 33 and to actuate the first clutch bearing 11; a second operation member 32 adapted to be rotatably coupled with the supporting member 33 and to actuate the second clutch bearing 21. The second operation member 32 is always spaced a predetermined distance from the first operation member 31 in an operation direction.

It should be understood by those skilled in the art, the operation direction refers to a direction of the force that the first operation member 31 applied on the first clutch bearing 11, and the force the second operation member 32 applied on the second clutch bearing 21. The operation direction is substantially parallel to a first output shaft coupled to the first clutch bearing 11 and a second output shaft coupled to the second clutch bearing 21.

According to embodiments of the present disclosure, the first operation member 31 is always spaced the predetermined distance from the second operation member 32 in an axial direction of the supporting member 33. In other words, the operation direction is parallel to the axial direction of the supporting member 33.

Figure 7:
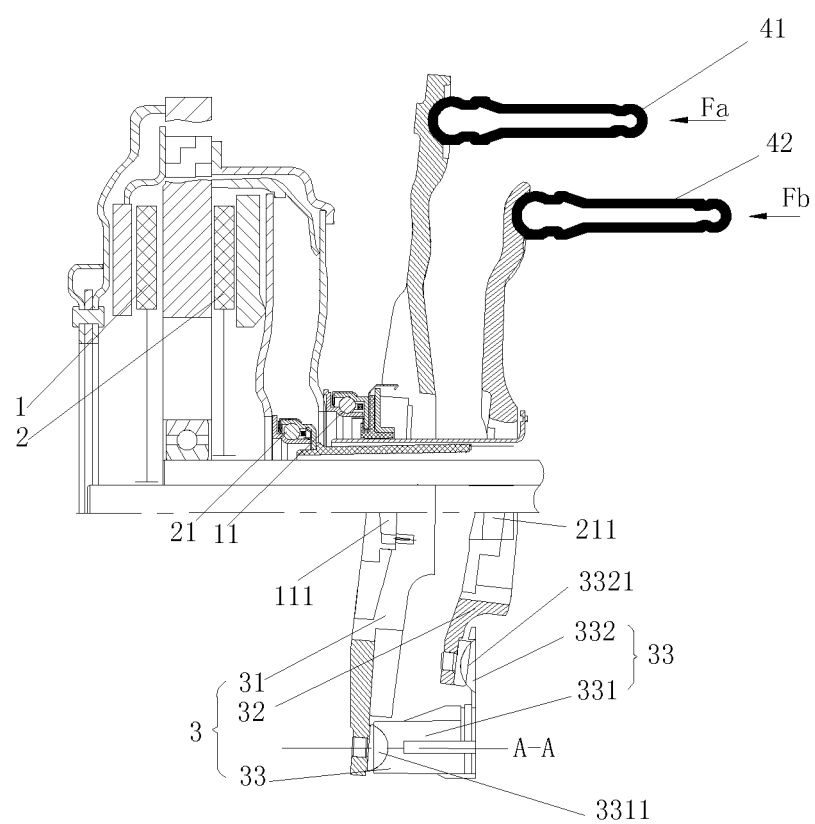
FIG. 7 is a cross-section, partial view of a dual-clutch assembly comprising the operation mechanism according to an embodiment of the present disclosure.

According to embodiments of the present disclosure, the supporting member 33 comprises a first and second supporting elements 331, 332 coupled to each other and having different heights from each other. For example, the first supporting element 331 and the second supporting element 332 each have a substantially cylinder shape, and an axial size (such as a height in the axial direction) of the first supporting element 331 is larger than an axial size (such as a height in the axial direction) of the second supporting element 332. Further, as shown in FIG. 7, an axial line of the first supporting element 331 is spaced a distance (not overlaid with each other) from with an axial line of the second supporting element 332. An axial direction A-A of the first supporting element is in substantially the same with (parallel to) the operation direction of the first operation member 31 and the operation direction of the second operation element 33.

Therefore, the first operation member 31 is constantly spaced the predetermined distance from the second operation member 32 in the axial direction A-A of the support member 33, i.e., the first and second operation members 31, 32 may not overlap or interfere with each other during the operation process. In other words, any one of the first and second operation members 31, 32 may not be supported on or positioned in the other operation member. Thus, each of the first and second operation members 31, 32 has its own operation area, and the operation areas of the first and second operation members 31, 32 may be independent and may not overlap or interfere with each other.

It has been found by the inventors of the present disclosure, as each of the first and second operation members 31, 32 is rotatably coupled to the supporting member 33, movements of the first and second operation members 31, 32 in the axial direction may be caused by the first operation member 31 moving against the second operation member 32, and if the first operation member 31 is overlaid with the second operation member 32, operation areas of the first and second operation members 31, 32 may overlap or interfere with each other. Thus, the second operation member 32 may attach to or contact the first operation member, further, the second operation member 32 may be affected or blocked by the first operation member 31. As described above, the stop or failure of one of the first and second operation members 31, 32 may result in the stop or failure of the other, causing the stop or failure of a vehicle using this clutch assembly. As a result, the operation state of the clutch assembly may be affected, and at the same time, the safety of the vehicle is challenged. With the operation mechanism according to embodiments of the present disclosure, the first operation member 31 has a predetermined distance with the second operation member 32 in the operation direction constantly, so that the problems above may be avoided. Further, the life of the clutch assembly can be improved, and the safety of the vehicle can be ensured. In addition, the operation mechanism according to embodiments of the present disclosure is simple in the structure.

According to embodiments of the present disclosure, the first clutch bearing 11 comprises a first bearing element 111, and the first operation member 31 comprises a first bearing area configured to contact the first bearing element 111. In an embodiment, a movement of the first operation member 31 may drive the first bearing element 111 so as to move the first clutch bearing 11.

According to embodiments of the present disclosure, the second bearing 21 comprises a second bearing element 211, and the second operation member 32 comprises a second bearing area configured to contact the second bearing element 211. In an embodiment, a movement of the second operation member 32 may drive the second bearing element 211 so as to move the second clutch bearing 21.

According to embodiments of the present disclosure, the first supporting element 331 of the supporting member 33 comprises a first positioning portion 3311, and the first operation member 31 comprises a first rotation portion 312 rotatably coupled to the first positioning portion 3311; the second supporting element 332 comprises a second positioning portion 3321, and the second operation member 32 comprises a second rotation portion 322 rotatably coupled to the second rotation portion 3321.

According to embodiments of the present disclosure, the first operation member 31 comprises a first guide groove 313 therein, and formed at an end of the first operation member 31 opposite the first rotation portion 312. According to embodiments of the present disclosure, the second operation member 32 comprises a second guide groove 323 therein, at an end of the second operation member 32 opposite the second rotation portion 323. The first and second guide grooves 313, 323 may couple or engage with a drive mechanism which provides a driving force for the operation mechanism of the dual-clutch assembly. As shown in FIG. 7, in some embodiments, the drive mechanism comprises a first hydraulic propeller 41 configured to couple with the first guide groove 313, and a second hydraulic propeller 42 configured to couple with the second guide groove 323. The first hydraulic propeller 41 may provide a driving force Fa to the first operation member 31, and the second hydraulic propeller 42 may provide a driving force Fb to the second operation member 32.

Figure 4:
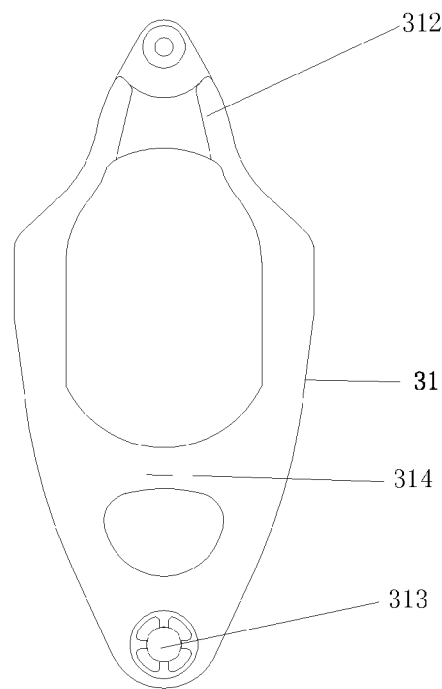
FIG. 4 is a front view of a first operation member of the operation mechanism according to another embodiment of the present disclosure.
Figure 5:
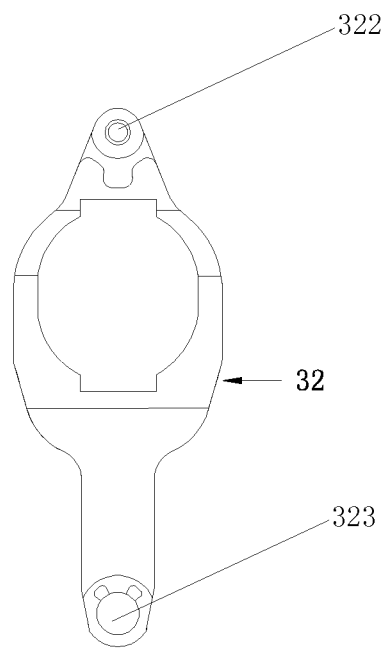
FIG. 5 is a front view of a second operation member of the operation mechanism according to an embodiment of the present disclosure.
Figure 6:
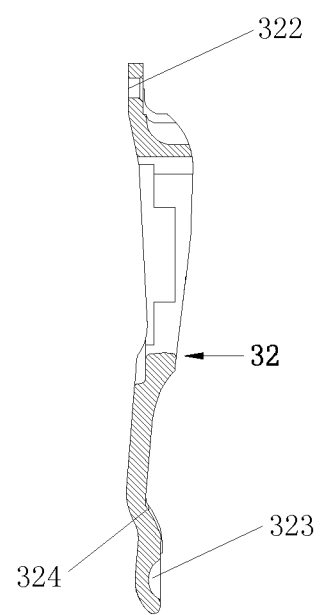
FIG. 6 is a cross-section view of a second operation member of the operation mechanism according to an embodiment of the present disclosure.

According to embodiments of the present disclosure, the first operation member 31 comprises a reinforcing structure. In the operation process of the operation mechanism, the first operation member 31 may undertake heavy force or torque. With the reinforcing structure, the strength of the first operation member 31 may be improved. As shown in FIG. 4, the reinforcing structure may be configured with a reinforcing rib 314. It should be understood by those skilled in the art, the reinforcing structure may not be limited to the structure of the reinforcing rib as shown in FIG. 4, and may be the reinforcing structure with any shape provided the strength of the first operation member 31 being ensured. In some embodiments, the reinforcing rib 314 and the first guide groove 313 may be formed on the same side of the first operation member 31.

According to embodiments of the present disclosure, the second operation member 32 comprises an arc transitional structure 324. During the operation process of the operation mechanism, the second operation member 32 may undertake heavy force or torque, and a slight or heavy deformation of the second operation member 32 may be caused as a result of the drive by the second operation member 32. With the arc transitional structure 324, life of the second operation member 32 may be increased.

The dual-clutch assembly of the present disclosure may be described as below.

The dual-clutch assembly according to embodiments of the present disclosure comprises a first clutch 1, a second clutch 2, and an operation mechanism 3. The first clutch 1 has a first clutch bearing 11, the second clutch 2 has a second clutch bearing 21, and the operation mechanism 3 comprises a first operation member 31 configured to actuate the first clutch bearing 11, a second operation member 32 configured to actuate the second clutch bearing 21, and a supporting member 33. Each of the first and second operation members 31, 32 is configured to be rotatably coupled to the supporting member 33. The second operation member 32 is always spaced a predetermined distance from the first operation member 31 in an operation direction. In some embodiment, the dual-clutch assembly may be a dual-lever clutch.

It should be understood by those skilled in the art, the operation mechanism 3 for the dual-clutch assembly may be any of the operation mechanism describe above.

An operation process of the operation mechanism 3 and the dual-clutch assembly may be provided in the following.

When a vehicle comprising the dual-clutch assembly needs a gearshift, the first operation member 31 is driven by the first hydraulic propeller 41, so as to attach to or contact the first bearing element 111 with the first bearing area on the first operation member 31. In that way, the force that the first hydraulic propeller 41 applied on the first operation member 31 may be transmitted onto the first bearing element 111, such that the first clutch bearing 11 which is coupled to the first bearing element 111 may move correspondingly to engage or disengage the first clutch 1. In a similar way, as the second operation member 32 is driven by the second hydraulic propeller 42 to attach to or contact the second bearing element 211 with the second bearing area on the second operation member 32, the force that the second hydraulic propeller 42 applied on the second operation member 32 may be transmitted to the second bearing element 211, such that the second clutch bearing 21 which is coupled to the second bearing element 211 may move correspondingly to engage or disengage the second clutch 2.

As described above, the dual-clutch assembly according to embodiments of the present disclosure is reliable in safety and simple in the structure.

According to embodiments of the present disclosure, a vehicle comprising the dual-clutch assembly is provided. The dual-clutch assembly comprises a first clutch 1 having a first clutch bearing 11, and a second clutch 2 having a second clutch bearing 21, and an operation mechanism 3. The operation mechanism 3 comprises: a supporting member 33; a first operation member 31 adapted to be rotatably coupled to the supporting member 33 and to actuate the first clutch bearing 11; and a second operation member 32 adapted to be rotatably coupled to the supporting member 33 and to actuate the second clutch bearing 21. The second operation member 32 is always spaced a predetermined distance from the first operation member 31 in an operation direction.

The vehicle according to embodiments of the present disclosure is simple in structure and reliable in safety.

It should be understood that, the operation mechanism, the dual-clutch assembly, and the vehicle applying the clutch assembly comprise other members or elements which are well known to those skilled in the art, thus the description of these members or elements are omitted herein.

Reference throughout this specification to "an embodiment," "some embodiments," "one embodiment", "another example," "an example," "a specific examples," or "some examples," means that a particular feature, structure, material, or characteristic described in connection with the embodiment or example is included in at least one embodiment or example of the disclosure. Thus, the appearances of the phrases such as "in some embodiments," "in one embodiment", "in an embodiment", "in another example, "in an example," "in a specific examples," or "in some examples," in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications can be made in the embodiments without departing from spirit and principles of the disclosure. Such changes, alternatives, and modifications all fall into the scope of the claims and their equivalents.

What is claimed is:

1. An operation mechanism for a dual-clutch assembly, the dual-clutch assembly comprising a first clutch having a first clutch bearing, and a second clutch having a second clutch bearing, the operation mechanism comprising:
   a supporting member;
   a first operation member adapted to be rotatably coupled to the supporting member and to actuate the first clutch bearing; and
   a second operation member adapted to be rotatably coupled to the supporting member and to actuate the second clutch bearing, the second operation member being always spaced a predetermined distance from the first operation member by the supporting member in an operation direction of the dual-clutch assembly,
   wherein the first operation member has a first predefined operation range along the operation direction of the dual-clutch assembly and the second operation member has a second predefined operation range along the operation direction of the dual-clutch assembly and there is no overlap between the first predefined operation range and the second predefined operation range; and
   wherein neither of the first operation member and the second operation member is positioned inside the other operation member.

2. The operation mechanism according to claim 1, wherein the first operation member is always spaced the predetermined distance from the second operation member in an axial direction of the supporting member.

3. The operation mechanism according to claim 1, wherein the first clutch bearing comprises a first bearing element, and the first operation member comprises a first bearing area configured to contact the first bearing element, and
   wherein the second bearing comprises a second bearing element, and the second operation member comprises a second bearing area configured to contact the second bearing element.

4. The operation mechanism according to claim 1, wherein the supporting member comprises first and second supporting elements coupled to each other and having different heights from each other,
   wherein the first supporting element comprises a first positioning portion, and the first operation member comprises a first rotation portion rotatably coupled to the first positioning portion; and
   wherein the second supporting element comprises a second positioning portion, and the second operation member comprises a second rotation portion configured to be rotatably coupled to the second rotation portion.

5. The operation mechanism according to claim 4, wherein the first operation member comprises a first guide groove formed at an end of the first operation member opposite the first rotation portion.

6. The operation mechanism according to claim 4, wherein the second operation member comprises a second guide groove formed at an end of the second operation member opposite the second rotation portion.

7. The operation mechanism according to claim 1, wherein the first operation member comprises a reinforcing structure.

8. The operation mechanism according to claim 7, wherein the reinforcing structure is configured with a reinforcing rib.

9. The operation mechanism according to claim 1, wherein the second operation member comprises an arc transitional structure.

10. A dual-clutch assembly comprising the operation mechanism according to claim 1.

11. A vehicle comprising the dual-clutch assembly according to claim 10.

* * * * *